United States Patent
Drumm

(10) Patent No.: US 8,087,786 B2
(45) Date of Patent: Jan. 3, 2012

(54) PROJECTOR

(75) Inventor: Jan Oliver Drumm, Regensburg (DE)

(73) Assignee: Osram AG, Munich (DE)

( * ) Notice: Subject to any disclaimer, the term of this patent is extended or adjusted under 35 U.S.C. 154(b) by 704 days.

(21) Appl. No.: 12/127,127

(22) Filed: May 27, 2008

(65) Prior Publication Data

US 2008/0297738 A1    Dec. 4, 2008

(30) Foreign Application Priority Data

May 31, 2007    (DE) .......................... 10 2007 025 329

(51) Int. Cl.
*G03B 21/20*    (2006.01)
*G09G 5/00*    (2006.01)

(52) U.S. Cl. ........................................ 353/31; 345/213

(58) Field of Classification Search .................... 353/31, 353/30; 345/213, 204
See application file for complete search history.

(56) References Cited

U.S. PATENT DOCUMENTS

| | | | | |
|---|---|---|---|---|
| 5,194,783 A * | 3/1993 | Ogino et al. | ............. | 315/368.13 |
| 5,526,325 A * | 6/1996 | Sullivan et al. | ............... | 367/138 |
| 6,518,807 B1 * | 2/2003 | Cho | ............... | 327/158 |
| 6,988,803 B2 * | 1/2006 | Maximus | ............... | 353/20 |
| 7,145,579 B2 * | 12/2006 | Arai et al. | ............... | 345/690 |
| 7,414,621 B2 * | 8/2008 | Yavid et al. | ............... | 345/204 |
| 2003/0034984 A1 * | 2/2003 | Murata | ............... | 345/589 |
| 2003/0128185 A1 * | 7/2003 | Arai et al. | ............... | 345/156 |
| 2003/0174019 A1 | 9/2003 | Suto et al. | ............... | 330/149 |
| 2004/0165153 A1 * | 8/2004 | Maximus | ............... | 353/30 |
| 2005/0110954 A1 | 5/2005 | Kojima | ............... | 353/31 |
| 2005/0111107 A1 | 5/2005 | Takeda et al. | ............... | 359/634 |
| 2008/0297738 A1 * | 12/2008 | Drumm | ............... | 353/85 |

FOREIGN PATENT DOCUMENTS

| | | |
|---|---|---|
| GB | 2385227 | 8/2003 |
| JP | 2001269313 | 10/2001 |
| WO | 2006/050263 | 5/2006 |

OTHER PUBLICATIONS

German Search Report; DE 102007025329.1; pp. 4, May 31, 2007.

* cited by examiner

*Primary Examiner* — John Lee

(57) ABSTRACT

The projector with at least two light sources for emission of light beams and a projection unit for controllable deflection of the light beams onto a projection surface has a control device to control light output of the light sources and a deflection of the projection unit, and also at least one digital delay element and at least one analog delay element for combined time delay of at least one of the light beams and/or deflection of the projection unit.

18 Claims, 5 Drawing Sheets

PROJECTOR

CROSS-REFERENCE TO RELATED APPLICATIONS

This application claims priority to German patent application Number 10 2007 025 329.1 filed on May 31, 2007, and which is incorporated herein by reference in its entirety.

TECHNICAL FIELD

The present invention relates to projectors, in particular laser projectors.

BACKGROUND

In many laser projectors, light beams of the primary colors RGB are directed onto a projection surface by a two-dimensional deflection mirror (so-called scanner mirror). By appropriate movement of the scanner mirror and a correspondingly coordinated time-intensity variation of the laser sources, an image is generated on the projection plane ("flying spot method").

Because of cable lengths, impedances and rise times related to the component, delays develop between the optical output signal (laser intensity) and the location of the laser image spot on the projection plane. The result is image distortion.

When several lasers are used (generally corresponding to several colors, or also the same color) in a design concept with intentional local image spot offset of the laser beams with a fixed mirror, image distortions on the projection level occur related to production or the design concept, if the time/location behavior of the intensity signals of the different light beams deviate from each other. In order to obtain good image quality, time agreement of the optical output signal and mirror movement for each laser image spot is required in the projection plane.

The problem of the aforementioned image distortions has thus far been solved by using high clock frequencies of the digital control electronics, in order to delay the corresponding laser control signals in the smallest possible steps. Delay of the digital voltage signal for laser control leads to a delay of the intensity signal of the laser by the same time unit. The smallest unit of digital delay corresponds to the time of the system clock of the control electronics. If a clock frequency is used that lies on the order of magnitude of the exposure time of the shortest exposed pixel, an error in time agreement on the order of half a pixel width can then occur (image unsharpness). To avoid this error in time agreement, a distinctly higher clock time is ordinarily used than the duration of the shortest exposed pixel. This means that the calculation and memory demands are significantly increased. The need for comparatively expensive control electronics follows from this.

SUMMARY

According to an embodiment, a particularly compact, cost-effective and efficient design of image projectors can be obtained by a projector comprising at least two light sources to emit light beams and a projection unit for controllable deflection of the light beams on projection plane, having a control device to control a light output of the light sources and deflection of the projection unit, and also having at least one digital delay element and at least one analog delay element for time delay of at least one of the light beams and/or the deflection of the projection unit.

According to a further embodiment, the digital delay element can be arranged between the control unit and at least one of the light sources in a signal path for controlling at least one light source. According to a further embodiment, the digital delay element can be arranged between the control unit and the projection unit in a signal path to control the projection unit. According to a further embodiment, the analog delay element can be arranged between the control unit and at least one of the light sources in a signal path to control the at least one light source. According to a further embodiment, the analog delay element can be arranged between the control unit and the projection unit in a signal path to control the projection unit. According to a further embodiment, a digital/analog converter can be arranged in the signal path between the digital delay element and the analog delay element. According to a further embodiment, the digital delay element and the analog delay element can be digitally controllable by the control unit.

According to another embodiment, a method for projection of at least two light beams by means of a projection unit onto a projection plane, may comprise the step of time delaying at least one of the light beams or a deflection of the projection unit by means of at least one digital delay element and at least one analog delay element combined.

According to a further embodiment, the digital delay element may delay a control signal to control the at least one light source. According to a further embodiment, the digital delay element may delay a control signal to control the projection unit. According to a further embodiment, the analog delay element may delay a control signal to control at least one light source. According to a further embodiment, the analog delay element may delay a control signal to control the projection unit. According to a further embodiment, an output signal of the digital delay element can be fed to the analog delay element as input signal to be delayed. According to a further embodiment, the digital output signal of the digital delay element can be converted to an analog signal and then fed to the analog delay element as an input signal to be delayed. According to a further embodiment, the digital delay element and the analog delay element can be digitally controlled by the control unit.

BRIEF DESCRIPTION OF THE DRAWINGS

In the following practical examples, the invention is schematically described by means of practical examples. Where useful, the same or similar parts are provided with the same reference numbers.

DETAILED DESCRIPTION

Figure 1:
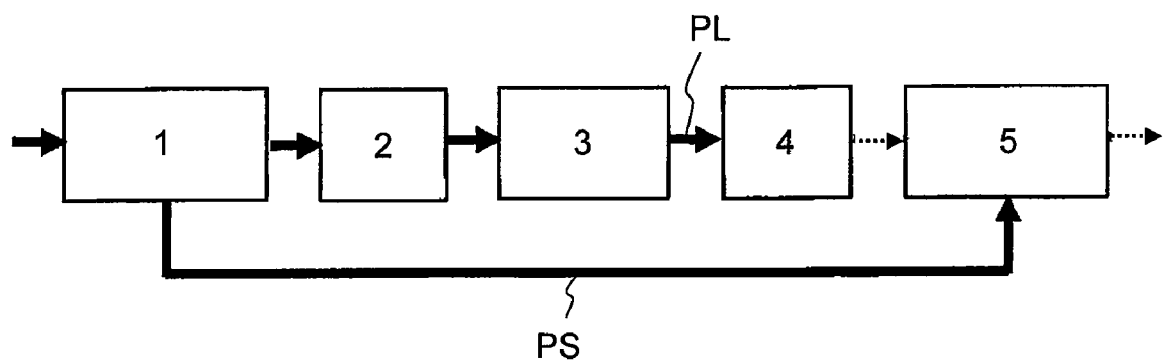
FIG. 1 shows a block diagram of the function of the laser projector with conventional scanner mirror.

According to various embodiments, the projector has at least two light sources to emit corresponding light beams and a projection unit for controllable deflection of the light beams onto a projection plane. The light source can be arbitrary, but preferably includes lasers, advantageously of the three primary colors red, green and blue. The projection unit with controlled deflection is not restricted, but preferably includes a scanner mirror.

A control device to control light output of the light sources and deflection of the projection unit is also present, for example, video electronics. The control device can include several components, for example, several integrated circuits. In addition, the projector has at least one digital delay element and at least one analog delay element for time delay of at least one of the light beams and/or deflection of the projection unit.

Through the above arrangement, the time delay of the laser and/or the voltage signal (or voltage signals) driving the projection device can form an overlap of the delay of the control signal present in digital form and a delay of the control signal present in analog form generated by the analog delay element. The analog delay can occur in smaller steps than is possible with a purely digital delay. In particular, a combination of digital delay and analog delay possesses the advantage that design of the control electronics with the minimally required clock frequency is possible, in which complete time agreement between the mirror movement and the time-intensity variation of the laser can nevertheless occur.

A digital delay element can be preferably arranged between the control unit and at least one of the light sources in a signal path to control the at least one light source.

A digital delay element can be preferably arranged, as an alternative or in addition, between the control unit and the projection unit in a signal path to control the projection unit.

An analog delay element can be preferably arranged, as an alternative or in addition, between the control unit and at least one of the light sources in a signal path to control the at least one light source.

An analog delay element can be preferably arranged, as an alternative or in addition, between the control unit and the projection unit and the signal path to control the projection unit.

A projector in which a digital/analog converter can be arranged in the signal path between the digital delay element and the analog delay element.

A projector in which the digital delay element and the analog delay element can be digitally controlled by the control unit may be preferred.

In the method for projection of at least two light beams by means of a projection unit onto a projection plane, at least one of the light beams and/or deflection of the projection unit is time-delayed by means of at least one digital delay element and at least one analog delay element combined.

A control signal to control the at least one light source can be preferably delayed by a digital delay element.

A control signal to control the projection unit may be preferably delayed by a digital delay element, as an alternative or in addition.

A control signal to control the at least one light source may be preferably delayed by an analog delay element, as an alternative or in addition.

A control signal to control the projection unit may be preferably delayed by an analog delay element, as an alternative or in addition.

An output signal of the digital delay element may be preferably fed as input signal to be delayed to the analog delay element.

A digital output signal of the digital delay element can be preferably converted to an analog signal and then fed as an input signal to be delayed to the analog delay element.

A method, in which the digital delay element and the analog delay element are digitally controlled by the control unit, can be preferred.

FIG. 1 shows a block diagram of the function of a laser projector with scanner mirror 5. The image spot of a specific light beam then describes a defined trajectory on the image plane, for example, a Lissajous figure or a line scanning. Drive of the scanner mirror 5 occurs by appropriate voltage signals that are generated and optionally amplified by a video electronics 1. The local intensity and color information of the image to be displayed (generally an RGB input signal) is converted for this purpose to a time-variable intensity signal. During time agreement of deflection of the scanner mirror 5 with the time-intensity variation of the corresponding laser 4, the desired image is formed on the projection plane. The time-intensity variation of laser 4 occurs by modulation of its operating current. For this purpose, a time-discrete value sequence presence in digital form is initially generated in the image-processing control unit (video electronics) 1, which contains an appropriate voltage information for each time step. This value sequence is converted by means of a digital/analog converter (DAC) 2 to an analog voltage signal and this transformed by a voltage-current converter (laser driver) 3 to a current signal. The laser 4 then converts this current signal to the desired optical laser intensity signal. In this example, a control signal path PL to control the laser 4 is thus obtained between the video electronics 1 and laser 4. The light beam emitted by laser 4 is directed onto the scanner mirror 5 and deflected by it, as indicated by the dotted arrows.

The video electronics 1 is simultaneously connected to the scanner mirror 5 via a signal line, in order to send control signals to control deflection of the scanner mirror 5. A (control) signal path PS to control the scanner mirror 5 is therefore obtained between the video electronics 1 and the scanner mirror 5.

FIG. 2A-2D show different timing diagrams as a plot of signal height versus time t.

Figure 2A:
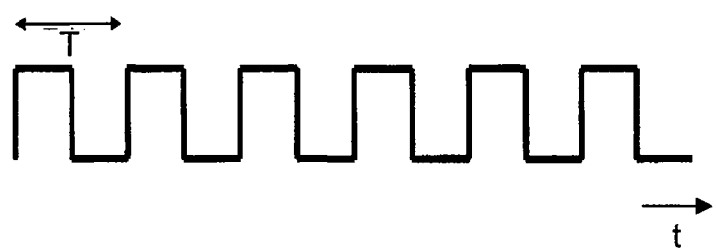
FIG. 2A-2D show different timing diagrams.

FIG. 2A shows a system clock of period T. Based on the sine-like oscillations of the scanner mirror (in both axes), the equally large image spots (pixels), depending on the projection surface, are exposed for different periods of time. For example, at a resolution of 640×480 image spots and scanning frequencies fx=28 kHz and fy=1200 Hz, the exposure time of the pixel in the center of the image is about 17 ns. This is the duration of the shortest illuminated pixel.

At a clock frequency of, say, 66.6 MHz (=15 ns) and an image buildup rate of 60 Hz, a length of the above described value sequence of $1.11 \cdot 10^6$ data points is obtained. The length of the value sequence scales with the clock frequency 1/T. The term clock frequency refers to the output of the digital value sequence. An electronic unit with higher clock frequency can be used for its calculation.

Figure 2B:
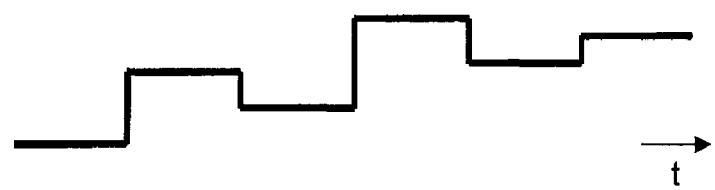

FIG. 2B shows an undelayed control signal as a plot of signal height versus time.

In order to achieve good image quality, time agreement of the optical output signal and the mirror movement for each laser spot is necessary. By corresponding delay of the digital voltage signal, the time agreement can be produced. By cable lengths, impedances and component-related rise times, delays of the optical output signal (laser intensity) develop, so that the actual image location does not coincide with the target image location. The result is undesired image distortion.

Figure 2C:

FIG. 2C shows a digital voltage signal delayed relative to the signal from FIG. 2B, in which the delay time ΔTd corresponds to a digital clock time T, which leads to a delay of the intensity signal of the laser by the same time unit. This one clock time T is also the smallest unit of a digital delay ΔTd, longer units of the clock delay correspond to a whole number multiple of clock time T. If a clock frequency 1/T is used, which lies on the order of magnitude of the exposure time of the shortest exposed pixel, an error in time agreement on the order of half a pixel width can occur (image unsharpness). To avoid this error in time agreement, a distinctly lower clock time T is ordinarily used than the duration of the shortest exposed pixel, with correspondingly higher clock frequency 1/T. This means that the calculation and memory expense of the digital time vector (value sequence) is significantly increased.

Figure 2D:
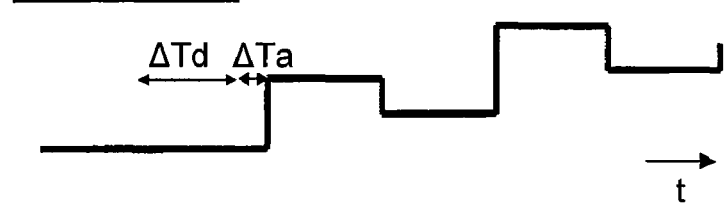

FIG. 2D shows a method for action of an analog delay element (so-called "analog delay"), which is an electronic unit that can shift an analog voltage signal by an adjustable time unit. This time unit is adjustable independently of the clock frequency.

The time delay of the voltage signal driving the laser in this example is an overlap of the digital delay ΔTd of the video signal present in digital form and an analog delay ΔTa generated by the analog delay. The analog delay ΔTa can occur in smaller steps than is possible with a purely digital delay ΔTd. A combination of digital delay ΔTd and analog delay ΔTa possesses the advantage that design of the video electronics is possible with minimal required clock frequency 1/T, in which time agreement between the signal movement and time-intensity variation of the laser can nevertheless occur.

The time delay for the scanner mirror control signal can also be similarly adjusted.

In the following practical examples, the hardware conversion of the delay of the optical output signal (laser intensity, etc.) or the mirror excitation signal is described more precisely in two steps.

Figure 3:
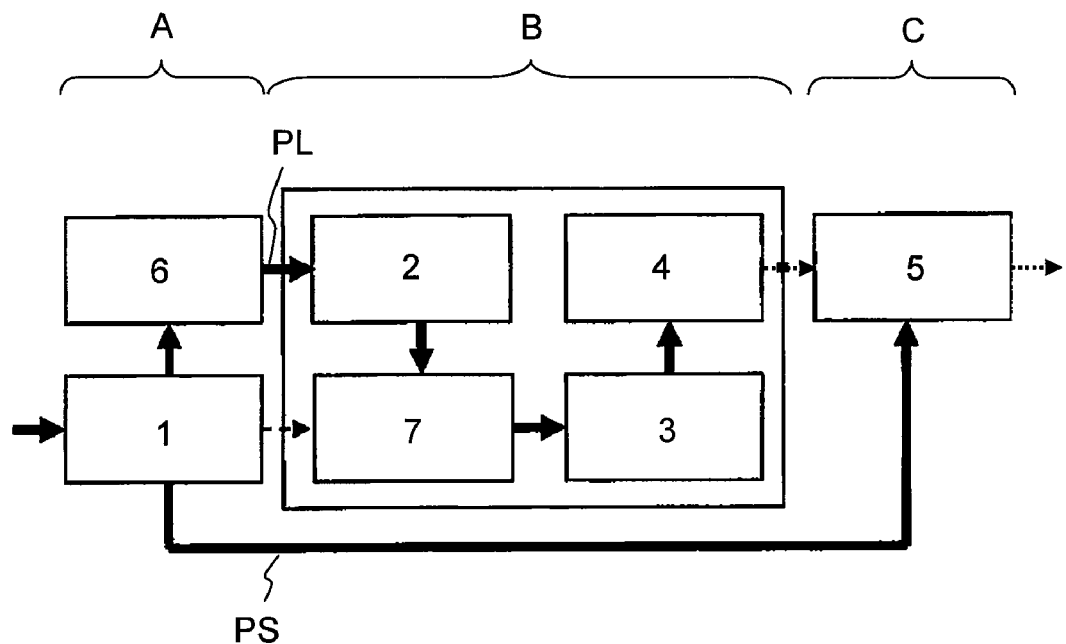
FIG. 3 shows a functional block diagram of a laser projector according to a first embodiment with scanner mirror.
Figure 4:
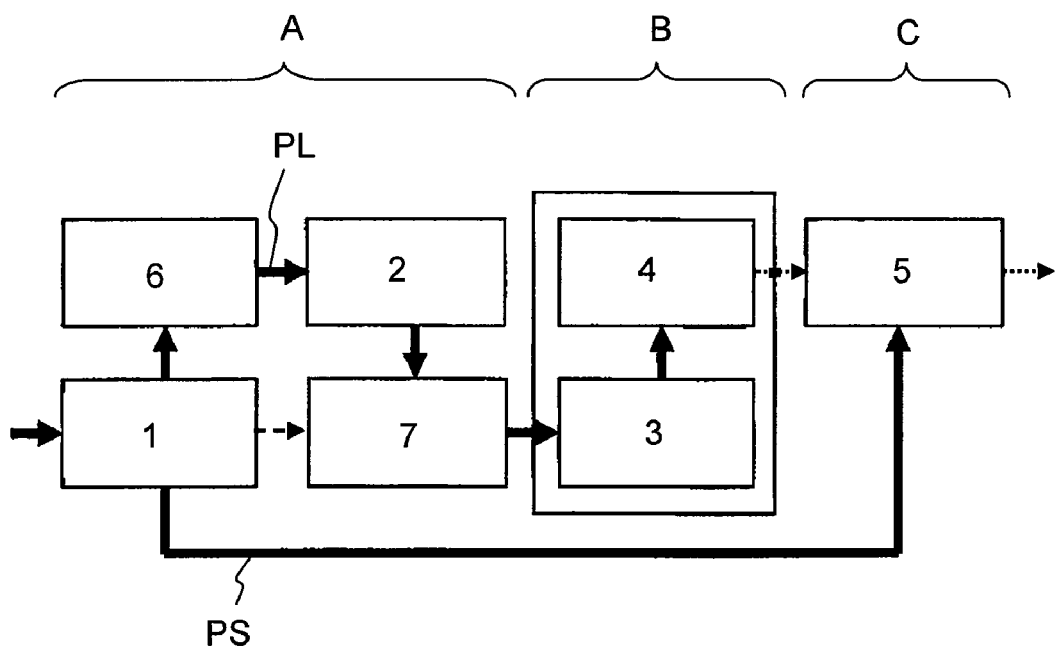
FIG. 4 shows a functional block diagram of a laser projector according to a second embodiment with scanner mirror.

FIG. 3 and FIG. 4 schematically depict two variants of a design for two-stage delay of an optical output signal. On the one hand, delay of the laser control signal present in digital form occurs in whole number multiples of the clock frequency of the digital and video electronics 1, and, on the other hand, the analog laser control signal can be delayed in smaller time steps and independently relative to the clock frequency.

The block diagrams of FIG. 3 and FIG. 4 each show three functional units, namely a video unit A, a light source unit B and a mirror unit C.

In FIG. 3 and FIG. 4, the assignment of the components 1-5 described in FIG. 1 differs, as does the assignment of a digital delay element (digital delay) 6 and an analog delay element (analog delay) 7 relative to the higher order functional units A, B and C.

In FIG. 3, the video electronics 1 and the digital delay element 6 are assigned to the video unit A, whereas the digital/analog converter (DAC) 2, the analog delay element 7, the laser driver 3 and the laser 4 are assigned to the light source unit B. In FIG. 3, the unit B has a digital signal input. The analog delay element 7 is also digitally controlled. An example of an analog delay element is the component EL9115 of the "Intersil" Company, which can delay analog signals from 0 to 62 ns.

In this practical example, a control signal to control laser 4 is sent by video electronics 1 to the digital delay element 6 via signal pat PL, in which, as described under FIG. 2C, it is delayed by a cycle T of a multiple of it. The delayed digital laser control signal is then fed via signal path PL to digital/analog converter 2, in which it is converted to a corresponding analog signal. This analog signal, delayed by ΔTd, is fed to the analog delay element 7, where it is delayed by ΔTa<ΔTd. As an alternative, depending on the required time delay, it could also be accelerated. This control signal, delayed by the digital delay element 6 and the analog delay element 7, is now fed via signal path PL to the laser driver 3, which generates a correspondingly delayed current signal and drives the laser 4 and controls its output with it. The laser 4 then sends a correspondingly delayed light beam to the scanner mirror 5, which deflects this light beam (dotted arrow) onto a projection surface (without imaging).

The video electronics 1 is connected as in FIG. 1 simultaneously to the scanner mirror 5 via a signal line (not shown), in order to be able to send control signals to the control deflection of scanner mirror 5. A (control) signal path PS to control the scanner mirror 5 is thus obtained between video electronics 1 and the scanner mirror.

The digital delay element 6, the video electronics 1, the DAC 2 and the analog delay element 7 are now assigned in FIG. 4 to video unit A, whereas the laser driver 4 an the laser 5 are assigned to light source unit B, but otherwise operate in the same functional manner as FIG. 3. In FIG. 4, the unit B has an analog signal input, which is connected to the signal output of the analog delay element 7.

Figure 5:
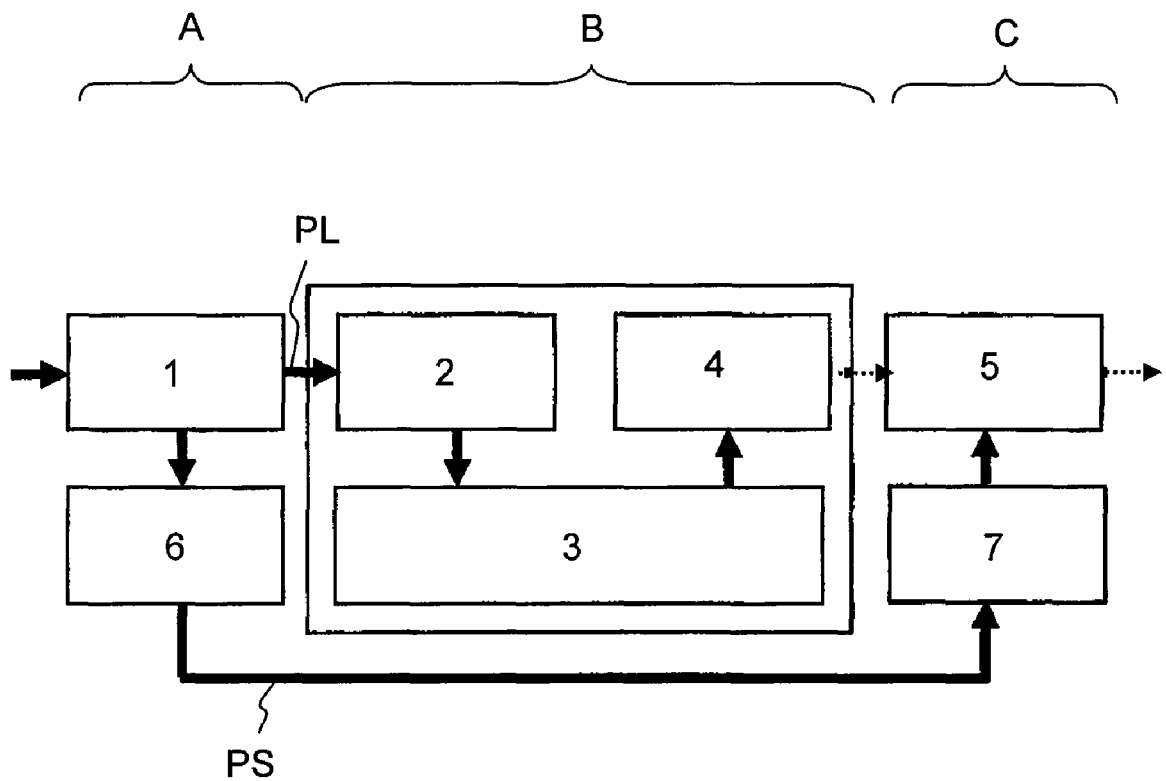
FIG. 5 shows a functional block diagram of a laser projector according to a third embodiment with scanner mirror.

In the variant depicted in FIG. 5, the mirror control signal is controlled in two stages. On the one hand, delay of the excitation signal (for example, the TTL signal), present in digital form and sent by the video electronics 1, occurs by means of digital delay element 6 in a whole number multiple of the clock frequency of the vide electronics 1. In addition, the excitation voltage signal is delayed by an analog delay element 7 connected downline of the digital delay element 6 and upline of the scanner mirror 5 in smaller time steps and independently with reference to clock frequency. The digital delay element 6 and the analog delay element 7 are therefore connected between the video unit 1 and the scanner mirror 5 and a signal path PS to control the projection unit. No delay elements, on the other hand, are connected in the signal path PL to control laser 4, as shown.

An analog/digital converter (without figure) can be connected between the digital delay element 6 and the analog delay element 7. As an alternative, the digital delay element 6 can produce an analog signal.

The digital delay element 6 and the video electronics 1 are assigned to the video unit A in FIG. 5. The digital delay element 6 then ensures digital delay of the mirror excitation signal. The DAC 2, the laser driver 3 and the laser 4 are assigned to the light source unit B. The analog delay element 7 and the scanner mirror 5 are assigned to the mirror unit C. Unit B in FIG. 5 has a digital signal input.

In the practical examples of FIGS. 1, 3, 4 and 5, the digital delay element 6 and the control unit 1 for adjustment of the time delay are digitally controllable, as indicated in FIG. 3 and FIG. 4 for the analog delay element 7 by the dashed arrow.

In these practical examples, units A, B and C can be constructed from discrete components, fully integrated electronically or partially integrated electronically (multi-chip). The unit B can be viewed as a compact miniaturized light source unit that contains at least one illumination device (laser 4) and optional optical elements (without figure). Unit B can generally contain a number of lasers 4 and laser drives 3.

Figure 6:
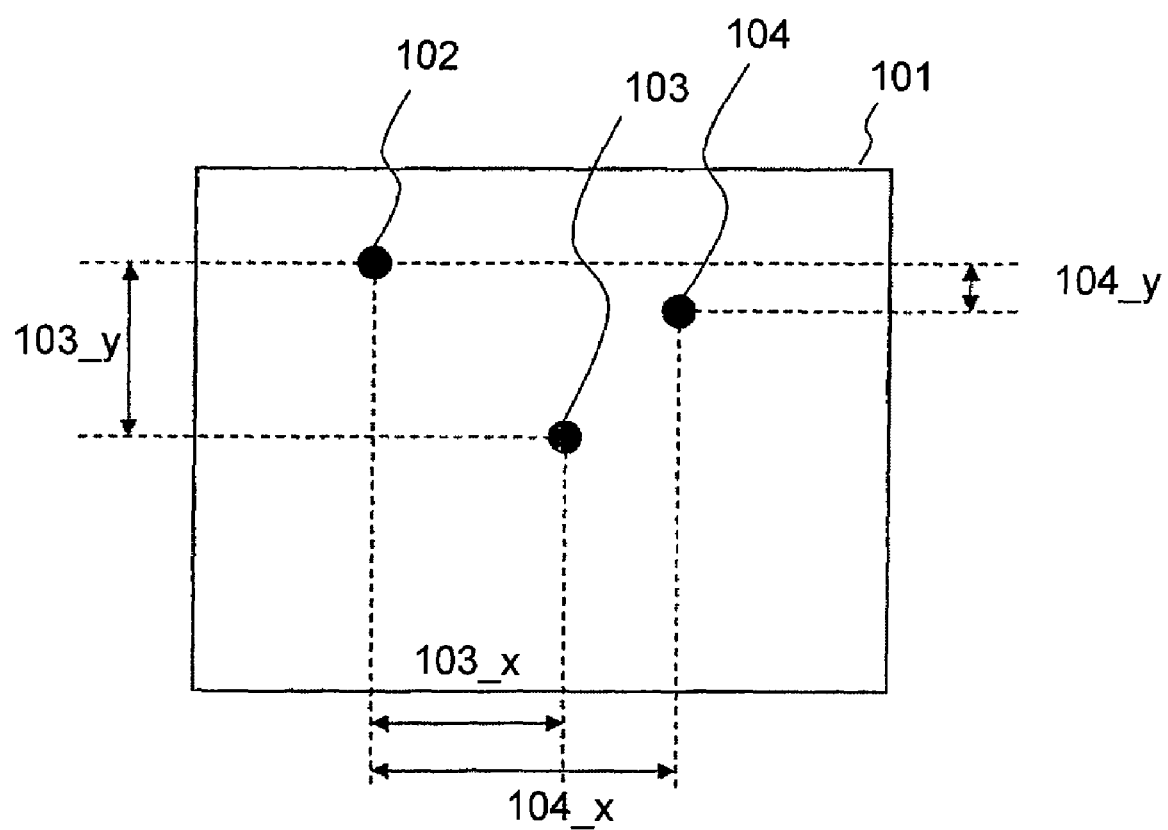
FIG. 6 shows, as a sketch, a projection surface with three locally offset single-beam image spots.

FIG. 6 shows a sketch of a projection surface 101 with three locally offset single beam image spots of three lasers, by means of which an example for determination of the offset of single beam image spots 102, 103, 104 of the projection surface 101 will be given below. The offset is obtained from the non-collinearity of the individual beams. In order to transmit useful image information, modulation of the individual laser sources must occur in phase-shifted fashion with reference to a reference beam the three points 102, 103, 104 have, as reference point, deviations in two directions during choice of the red reference point 102. The image spot 103 deviates from point 102 in the x and y-direction by 103_*x* and 103_*y*. The image spot 104 also has a deviation 104_*x* in the x-direction and 104_*y* in the y-direction from the reference point 102. Angle deviations can be determined from these Cartesian deviations 103_*x*, 103_*y*, 104_*x*, 104_*y* (projection deviations). For example, the assumption that a image spot offset by one line in one row at a resolution of 1024×768, a projection distance of 1.5 m and an image size of 42 cm×29.7 cm leads to an angle deviation of 0.015° in the line and 0.016° in the row.

A phase shift of the light beams from each other can be determined from the angle deviations. The phase shift refers to the electronic signals for controlling the corresponding light beams. If the electronic signals of the corresponding light beams are modulated by the determined phase shift, which means a time delay of the individual light beams, the desired offset-free color impression on the projection surface 101 can be reproduced. This calculated time delay is entered in the aforementioned video electronics, as indicated there by the arrow on the left.

The invention naturally is not restricted to the practical examples described above. Several of the depicted components 1-7 can be used. The digital delay element 6 and the analog delay element 7 can also be exchanged, in which case additional components can be necessary, like an analog/digital converter. The invention is also not restricted to lasers or scanner mirrors.

The projector can also include both a combined analog and digital delay, both of the laser control signal and the mirror control signal. As an alternative, the laser control signal can be digitally delayed and the mirror control signal analog delayed or vice-versa.

LIST OF REFERENCE NUMBERS

1 Video electronics
2 Digital/analog converter
3 Laser driver
4 Laser
5 Scanner mirror
6 Digital delay element
7 Analog delay element
101 Projection surface
102 Single-beam image spot
103 Single-beam image spot
104 Single-beam image spot
103_*x* Projection deviation in x-direction
103_*y* Projection deviation in y-direction
104_*x* Projection deviation in x-direction
104_*y* Projection deviation in y-direction
A Video unit
B Light source unit
C Mirror unit
PL Laser control signal path
PS Scanner signal control signal path
t Time
T Clock time
fx Scanning frequency in x-direction
fy Scanning frequency in y-direction
$\Delta T_d$ Digital delay time
$\Delta T_a$ Analog delay time

What is claimed is:

1. A projector comprising at least two light sources to emit light beams and a projection unit for controllable deflection of the light beams on a projection plane, a control device to control a light output of the light sources and deflection of the projection unit, and at least one digital delay element and at least one analog delay element for time delay of at least one of the light beams or the deflection of the projection unit wherein at least one of the digital delay element and the analog delay element is arranged between the control device and the projection unit in a signal path to control the projection unit.

2. The projector according to claim 1, wherein one of the digital delay element and the analog delay is arranged between the control unit and at least one of the light sources in a signal path for controlling at least one light source.

3. The projector according to claim 1, wherein a digital/analog converter is arranged in a signal path between the digital delay element and the analog delay element.

4. A projector comprising at least two light sources to emit light beams and a projection unit for controllable deflection of the light beams on projection plane, a control device to control a light output of the light sources and deflection of the projection unit, and at least one digital delay element and at least one analog delay element for time delay of at least one of the light beams or the deflection of the projection unit wherein the digital delay element and the analog delay element are digitally controllable.

5. A method for projection of at least two light beams by means of a projection unit onto a projection plane, the method comprising the step of:

time delaying a deflection of the projection unit by means of at least one of a digital delay element and an analog delay element.

6. The method according to claim 5, wherein at least one of the digital delay element and the analog delay element delays a control signal to control the at least one light source.

7. The method according to claim 5, wherein at least one of the digital delay element and the analog delay element delays a control signal to control the projection unit.

8. The method according to claim 5, wherein an output signal of the digital delay element is fed to the analog delay element as input signal to be delayed.

9. The method according to claim 8, wherein the digital output signal of the digital delay element is converted to an analog signal and then fed to the analog delay element as an input signal to be delayed.

10. The method according to claim 8, wherein the digital delay element and the analog delay element are digitally controlled.

11. The projector according to claim 1, wherein the projector comprises a video unit comprising a video electronics, a light source unit comprising at least one laser driver and at least one laser, and a mirror unit comprising a scanner mirror.

12. The projector according to claim 11, wherein the digital delay element is part of the video unit and the analog delay element is part of the deflection unit.

13. The projector according to claim 4, wherein at least one of the digital delay element and the analog delay is arranged between the control unit and at least one of the light sources in a signal path for controlling at least one light source.

14. The projector according to claim 13, wherein at least one of the digital delay element and the analog delay element is arranged between the control unit and the projection unit in a signal path to control the projection unit.

15. The projector according to claim 4, wherein a digital/analog converter is arranged in the signal path between the digital delay element and the analog delay element.

16. The projector according to claim 4, wherein the projector comprises a video unit comprising a video electronics, a light source unit comprising at least one laser driver and at least one laser, and a mirror unit comprising a scanner mirror.

17. The projector according to claim 16, wherein the digital delay element is part of the video unit and the analog delay element is part of the deflection unit.

18. The method according to claim 5, wherein the method comprises the step of:

time delaying at least one of the light beams by means of at least one of the digital delay element and the analog delay element.

* * * * *